United States Patent
Ait Aoudia et al.

(10) Patent No.: US 12,159,228 B2
(45) Date of Patent: Dec. 3, 2024

(54) END-TO-END LEARNING IN COMMUNICATION SYSTEMS

(71) Applicant: Nokia Technologies Oy, Espoo (FI)

(72) Inventors: Faycal Ait Aoudia, Saint-Cloud (FR); Jakob Hoydis, Paris (FR); Abderrahmane Tchikou, Antony (FR)

(73) Assignee: Nokia Technologies Oy, Espoo (FI)

( * ) Notice: Subject to any disclaimer, the term of this patent is extended or adjusted under 35 U.S.C. 154(b) by 932 days.

(21) Appl. No.: 17/277,105

(22) PCT Filed: Sep. 25, 2018

(86) PCT No.: PCT/EP2018/076024
§ 371 (c)(1),
(2) Date: Mar. 17, 2021

(87) PCT Pub. No.: WO2020/064093
PCT Pub. Date: Apr. 2, 2020

(65) Prior Publication Data
US 2021/0374529 A1  Dec. 2, 2021

(51) Int. Cl.
*G06N 3/08* (2023.01)
*H04B 1/02* (2006.01)
*H04B 1/06* (2006.01)

(52) U.S. Cl.
CPC .............. *G06N 3/08* (2013.01); *H04B 1/02* (2013.01); *H04B 1/06* (2013.01)

(58) Field of Classification Search
CPC ................................ G06N 3/08; G06N 3/006
(Continued)

(56) References Cited

U.S. PATENT DOCUMENTS

| 10,305,553 B2 * | 5/2019 | O'Shea | G06N 3/045 |
| 2012/0036016 A1 * | 2/2012 | Hoffberg | H04N 21/47 455/457 |

(Continued)

FOREIGN PATENT DOCUMENTS

| CN | 105825269 A | 8/2016 |
| CN | 106203624 A | 12/2016 |

(Continued)

OTHER PUBLICATIONS

Dorner et al., "Deep Learning-Based Communication Over the Air", arXiv, Jul. 11, 2017, pp. 1-11.
(Continued)

*Primary Examiner* — Ruay Ho
(74) *Attorney, Agent, or Firm* — McCarter & English LLP

(57) ABSTRACT

An apparatus, method and computer program is described comprising: initialising parameters of a transmission system, wherein the transmission system comprises a transmitter, a channel and a receiver, wherein the transmitter includes a transmitter algorithm having at least some trainable weights and the receiver includes a receiver algorithm having at least some trainable weights; updating trainable parameters of the transmission system based on a loss function, wherein the trainable parameters include the trainable weights of the transmitter and the trainable weights of the receiver and wherein the loss function includes a penalty term; quantizing said trainable parameters, such that said weights can only take values within a codebook having a finite number of entries that is a subset of the possible values available during updating; and repeating the updating and quantizing until a first condition is reached.

15 Claims, 5 Drawing Sheets

(58) Field of Classification Search
USPC .................................. 706/22; 901/3; 455/457
See application file for complete search history.

(56) References Cited

U.S. PATENT DOCUMENTS

| | | | |
|---|---|---|---|
| 2016/0096270 A1* | 4/2016 | Ibarz Gabardos ..... | G06N 3/049 901/3 |
| 2017/0286830 A1 | 10/2017 | El-yaniv et al. | |
| 2018/0046894 A1 | 2/2018 | Yao | |
| 2018/0107925 A1 | 4/2018 | Choi et al. | |
| 2018/0253401 A1 | 9/2018 | Cardinaux et al. | |
| 2020/0380675 A1* | 12/2020 | Golden ................... | G06T 7/143 |

FOREIGN PATENT DOCUMENTS

| | | | |
|---|---|---|---|
| CN | 111434049 B * | 6/2021 | ............ G06N 3/006 |
| WO | 2018/193018 A1 | 10/2018 | |
| WO | 2018/233932 A1 | 12/2018 | |
| WO | 2018/234084 A1 | 12/2018 | |
| WO | 2019/080987 A1 | 5/2019 | |
| WO | 2019/080988 A1 | 5/2019 | |
| WO | 2019/135019 A1 | 7/2019 | |
| WO | 2019/193377 A1 | 10/2019 | |
| WO | 2019/193380 A1 | 10/2019 | |

OTHER PUBLICATIONS

Carreira-Perpinan et al., "Model Compression as Constrained Optimization, with Application to Neural Nets. part i: Quantization", arXiv, Jul. 13, 2017, pp. 1-33.
O'Shea et al., "An Introduction to Deep Learning for the Physical Layer", arXiv, Jul. 11, 2017, pp. 1-13.
Han et al., "Deep Compression: Compressing Deep Neural Networks with Pruning, Trained Quantization and Huffman Coding", arXiv, Feb. 15, 2016, pp. 1-14.
Hubara et al., "Quantized Neural Networks: Training Neural Networks with Low Precision Weights and Activations", arXiv, Sep. 22, 2016, pp. 1-29.
Fernando et al., "Convolution by Evolution: Differentiable Pattern Producing Networks", arXiv, Jun. 8, 2016, 8 pages.
Agustsson et al., "Soft-to-hard Vector Quantization for End-to-end Learning Compressible Representations", arXiv, Jun. 8, 2017, pp. 1-16.
Carreira-Perpinan, "Model Compression as Constrained Optimization, with Application to Neural Nets. Part I: General Framework", arXiv, Jul. 5, 2017, pp. 1-23.
International Search Report and Written Opinion received for corresponding Patent Cooperation Treaty Application No. PCT/EP2018/076024, dated Jun. 11, 2019, 14 pages.
O'Shea et al., "Deep Learning-Based MIMO Communications", arXiv, Jul. 25, 2017, pp. 1-9.

* cited by examiner

END-TO-END LEARNING IN COMMUNICATION SYSTEMS

RELATED APPLICATION

This application claims priority to PCT Application No. PCT/EP2018/076024, filed on Sep. 25, 2018 which is incorporated herein by reference in its entirety.

FIELD

The present specification relates to learning in communication systems.

BACKGROUND

A simple communications system includes a transmitter, a transmission channel, and a receiver. The design of such communications systems may involve the separate design and optimisation of each part of the system. An alternative approach is to consider the entire communication system as a single system and to seek to optimise the entire system. Although some attempts have been made in the prior art, there remains scope for further developments in this area.

SUMMARY

In a first aspect, this specification provides an apparatus comprising: means (such as an initialisation or control module) for initialising parameters of a transmission system, wherein the transmission system comprises a transmitter, a channel and a receiver, wherein the transmitter includes a transmitter algorithm having at least some trainable weights and the receiver includes a receiver algorithm having at least some trainable weights; means (such as a training module) for updating trainable parameters of the transmission system based on a loss function, wherein the trainable parameters include the trainable weights of the transmitter and the trainable weights of the receiver and wherein the loss function includes a penalty term; means (such as a quantization module) for quantizing said trainable parameters, such that said weights can only take values within a codebook having a finite number of entries that is a subset of the possible values available during updating (or training); and means (such as a control module) for repeating the updating and quantizing until a first condition is reached. Given that any hardware implementation offers only finite precision, the use of a codebook in the first aspect may be considered to involve choosing a lower precision that that provided by the hardware on which the system is trained.

The penalty term may include a variable that is adjusted (e.g. increased) on each repetition of the updating and quantizing such that, on each repetition, more weight is given in the loss function to a difference between the trainable parameters and the quantized trainable parameters. In this way, the trainable parameters may be progressively enforced to take values close to (or within) the restricted set (i.e. the codebook).

The means for quantizing said trainable parameters may express said quantized weights using fixed point arithmetic. Fixed point arithmetic (e.g. k-bit fixed arithmetic) may reduce memory requirements and simplify arithmetic operations when compared with floating point arithmetic that is often used in neural network implementations.

Some embodiments may further comprise a control module or some other means for updating variables on each repetition.

The first condition may be met when a difference between the trainable parameters and the quantized trainable parameters is below a threshold level. Alternatively, or in addition, the first condition may comprise a defined (e.g. pre-set) number of iterations.

Some embodiments may further comprise a multiplier (or some other means) for scaling a signal received at the receiver by a scaling factor (for example before being processed by the receiver). The scaling factor may be a function of the input. The scaling factor may be learned. In some embodiments, the scaling factor may be such that a dynamic range of the received signal is matched to the codebook.

In some embodiments, the transmitter may be implemented as a look-up table.

The loss function may be related to one or more of block error rate, bit error rate and categorical cross-entropy.

The means for updating trainable parameters of the transmission system may comprise optimising one or more of a batch size of the transmitter-training sequence of messages, a learning rate, and a distribution of the perturbations applied to the perturbed versions of the transmitter-training sequence of messages.

At least some weights of the transmitter and receiver algorithms may be trained using stochastic gradient descent.

The transmitter algorithm may comprise a transmitter neural network. Alternatively, or additionally, the receiver algorithm may comprise a receiver neural network.

The said means may comprise: at least one processor; and at least one memory including computer program code, the at least one memory and the computer program configured, with the at least one processor, to cause the performance of the apparatus.

In a second aspect, this specification provides a method comprising: initialising parameters of a transmission system, wherein the transmission system comprises a transmitter, a channel and a receiver, wherein the transmitter includes a transmitter algorithm having at least some trainable weights and the receiver includes a receiver algorithm having at least some trainable weights; updating trainable parameters of the transmission system based on a loss function, wherein the trainable parameters include the trainable weights of the transmitter and the trainable weights of the receiver and wherein the loss function includes a penalty term; quantizing said trainable parameters, such that said weights can only take values within a codebook having a finite number of entries that is a subset of the possible values available during updating (or training); and repeating the updating and quantizing until a first condition is reached.

The penalty term may include a variable that is adjusted (e.g. increased) on each repetition of the updating and quantizing such that, on each repetition, more weight is given in the loss function to a difference between the trainable parameters and the quantized trainable parameters.

The quantized trainable parameters may express said quantized weights using fixed point arithmetic.

The first condition may be met when a difference between the trainable parameters and the quantized trainable parameters is below a threshold level. Alternatively, or in addition, the first condition may comprise a defined number of iterations.

In some embodiments, the transmitter may be implemented as a look-up table.

At least some weights of the transmitter and receiver algorithms may be trained using stochastic gradient descent.

In a third aspect, this specification describes any apparatus configured to perform any method as described with reference to the second aspect.

In a fourth aspect, this specification describes a work product comprising a look up table or array, created by any method as described with reference to the second aspect.

In a fifth aspect, this specification describes computer-readable instructions which, when executed by computing apparatus, cause the computing apparatus to perform any method as described with reference to the second aspect.

In a sixth aspect, this specification describes a computer program comprising instructions for causing an apparatus to perform at least the following: initialise parameters of a transmission system, wherein the transmission system comprises a transmitter, a channel and a receiver, wherein the transmitter includes a transmitter algorithm having at least some trainable weights and the receiver includes a receiver algorithm having at least some trainable weights; update trainable parameters of the transmission system based on a loss function, wherein the trainable parameters include the trainable weights of the transmitter and the trainable weights of the receiver and wherein the loss function includes a penalty term; quantize said trainable parameters, such that said weights can only take values within a codebook having a finite number of entries that is a subset of the possible values available during updating; and repeat the updating and quantizing until a first condition is reached. The penalty term may include a variable that is adjusted (e.g. increased) on each repetition of the updating and quantizing such that, on each repetition, more weight is given in the loss function to a difference between the trainable parameters and the quantized trainable parameters.

In a seventh aspect, this specification describes a computer-readable medium (such as a non-transitory computer readable medium) comprising program instructions stored thereon for performing at least the following: initialising parameters of a transmission system, wherein the transmission system comprises a transmitter, a channel and a receiver, wherein the transmitter includes a transmitter algorithm having at least some trainable weights and the receiver includes a receiver algorithm having at least some trainable weights; updating trainable parameters of the transmission system based on a loss function, wherein the trainable parameters include the trainable weights of the transmitter and the trainable weights of the receiver and wherein the loss function includes a penalty term; quantizing said trainable parameters, such that said weights can only take values within a codebook having a finite number of entries that is a subset of the possible values available during updating; and repeating the updating and quantizing until a first condition is reached.

In an eighth aspect, this specification describes an apparatus comprising: at least one processor; and at least one memory including computer program code which, when executed by the at least one processor, causes the apparatus to: initialise parameters of a transmission system, wherein the transmission system comprises a transmitter, a channel and a receiver, wherein the transmitter includes a transmitter algorithm having at least some trainable weights and the receiver includes a receiver algorithm having at least some trainable weights; update trainable parameters of the transmission system based on a loss function, wherein the trainable parameters include the trainable weights of the transmitter and the trainable weights of the receiver and wherein the loss function includes a penalty term; quantize said trainable parameters, such that said weights can only take values within a codebook having a finite number of entries that is a subset of the possible values available during updating; and repeat the updating and quantizing until a first condition is reached.

In a ninth aspect, this specification describes an apparatus comprising: an initialisation module for initialising parameters of a transmission system, wherein the transmission system comprises a transmitter, a channel and a receiver, wherein the transmitter includes a transmitter algorithm having at least some trainable weights and the receiver includes a receiver algorithm having at least some trainable weights; a training module for updating trainable parameters of the transmission system based on a loss function, wherein the trainable parameters include the trainable weights of the transmitter and the trainable weights of the receiver and wherein the loss function includes a penalty term; a quantization module for quantizing said trainable parameters, such that said weights can only take values within a codebook having a finite number of entries that is a subset of the possible values available during updating; and a control module for repeating the updating and quantizing until a first condition is reached.

BRIEF DESCRIPTION OF THE DRAWINGS

Example embodiments will now be described, by way of non-limiting examples, with reference to the following schematic drawings, in which.

DETAILED DESCRIPTION

Figure 1:
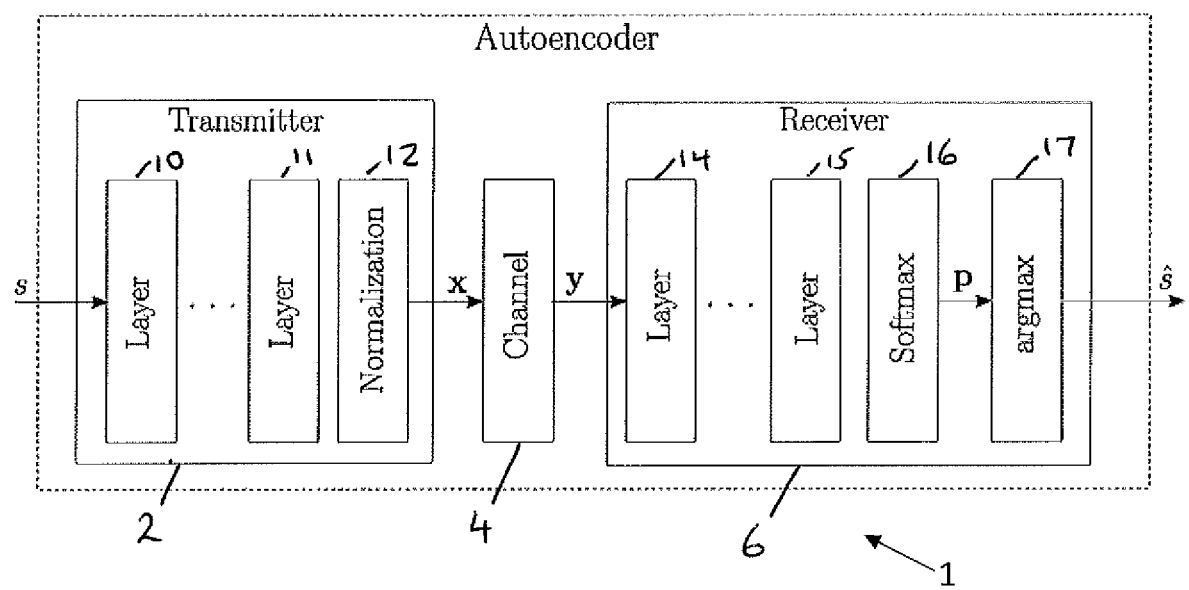
FIG. 1 is a block diagram of an example end-to-end communication system.

FIG. 1 is a block diagram of an example end-to-end communication system implemented as a neural network, indicated generally by the reference numeral 1, in which example embodiments may be implemented. The system 1 includes a transmitter 2, a channel 4 and a receiver 6. Viewed at a system level, the system 1 converts an input symbol (s) (also called a message) received at the input to the transmitter 2 into an output symbol (S) at the output of the receiver 6.

The transmitter 2 implements a transmitter algorithm. Similarly, the receiver 6 implements a receiver algorithm. As described in detail below, the algorithms of the transmitter 2 and the receiver 6 are trained in order to optimise the performance of the system 1 as a whole.

The system 1 therefore provides an autoencoder implementing an end-to-end communication system. The autoencoder can be trained with respect to an arbitrary loss function that is relevant for a certain performance metric, such as block error rate (BLER). (The terms 'autoencoder' and 'communication system' are both used below to described the system 1.)

As discussed further below, one obstacle to practical hardware implementation of the communication system (or autoencoder) 1 is the high memory requirement and computational complexity of the involved neural networks. Hardware acceleration may be needed to achieve reasonable interference time. However, graphical processing units (GPUs) that can be used to accelerate neural network evaluations come at a high monetary and energy cost that may not be viable in many communication systems.

The transmitter algorithm implemented by the transmitter 2 may be implemented as a differentiable parametric function and may include at least some trainable weights (which may be trainable through stochastic gradient descent). Similarly, the receiver algorithm implemented by the receiver 6 may be implemented as a differentiable parametric function and may include at least some trainable weights (which may be trainable through stochastic gradient descent).

The transmitter 2 seeks to communicate one out of M possible messages $s \in \mathcal{M} = \{1, 2, \ldots, M\}$ to the receiver 6. To this end, the transmitter 2 sends a complex-valued vector representation $x=x(s) \in \mathbb{C}^n$ of the message through the channel 4. Generally, the transmitter hardware imposes constraints on x, e.g. an energy constraint $\|x\|_2^2 \leq n$, an amplitude constraint $|x_i| \leq 1 \forall i$, or an average power constraint $\mathbb{E}[|x_i|^2] \leq 1 \forall i$. The channel is described by the conditional probability density function (pdf) p(y|x), where $y \in \mathbb{C}^n$ denotes the received signal. Upon reception of y, the receiver produces the estimate ŝ of the transmitted message s.

As shown in FIG. 1, the transmitter 2 includes a dense layer of one or more units 10, 11 (e.g. including one or more neural networks) and a normalization module 12. The dense layers 10, 11 may include an embedding module. The modules within the transmitter 2 are provided by way of example and modifications are possible.

The message index s may be fed into an embedding module, embedding: $M \mathbb{C} \mathbb{C}^{n_{emb}}$, that transforms s into an $n_{emb}$-dimensional real-valued vector.

The embedding module may be followed by several dense neural network (NN) layers 10, 11 with possible different activation functions (such as ReLU, tan h, signmoid, linear etc.). The final layer of the neural network may have has 2n output dimensions and a linear activation function. If no dense layer is used, $n_{emb}=2n$.

The output of the dense layers 10, 11 may be converted to a complex-valued vector through the mapping $\mathbb{C}2\mathbb{C}: \mathbb{R}^{2n} \mathbb{C} \mathbb{C}^n$, which could be implemented as $\mathbb{C}2\mathbb{C}(z) = z_0^{n-1} + j z_n^{2n-1}$. (This is not shown and is a purely optional step.)

A normalization is applied by the normalization module 12 that ensures that power, amplitude or other constraints are met. The result of the normalization process is the transmit vector x of the transmitter 2 (where $x \in \mathbb{C}^{2n}$). As noted above, modifications may be made to the transmitter 2, for example the order of the complex vector generation and the normalization could be reversed.

The transmitter 2 defines the following mapping:

$$TX: \mathcal{M} \mathbb{C} \mathbb{C}^{2n}, \mathcal{M} = \{0, \ldots, M-1\}.$$

In other words, TX maps an integer from the set $\mathcal{M}$ to an 2n-dimensional real-valued vector. One example mapping is described above. Other neural network architectures are possible and the illustration above services just as an example.

As shown in FIG. 1, the receiver 6 includes a dense layer of one or more units 14, 15 (e.g. including one or more neural networks), a softmax module 16 and an arg max module 17. As described further below, the output of the softmax module is a probability vector that is provided to the input of an arg max module 17. The modules within the receiver 6 are provided by way of example and modifications are possible.

If the channel output vector $y \in \mathbb{C}^n$ is complex-valued, it may be transformed by the receiver 6 into a real-valued vector of 2n dimensions through the mapping $\mathbb{C}2\mathbb{C}: \mathbb{C}^n \mathbb{C}^{2n}$, which could be implemented as $\mathbb{C}2\mathbb{C}(z) = [\mathcal{R}\{z\}^T, \mathcal{I}\{z\}^T]^T$. This step is not necessary for real-valued channel outputs $y \in \mathbb{C}^{2n}$.

The result is fed into the one or more layers 14, 15, which layers may have different activation functions such as ReLU, tan h, sigmoid, linear, etc. The last layer may have M output dimensions to which a softmax activation is applied (by softmax module 16). This generates the probability vector $p \in \mathbb{C}^M$, whose ith element $[p]_i$ can be interpreted as Pr(s=i|y). A hard decision for the message index is obtained as ŝ=arg max(p) by arg max module 17.

The transmitter 2 and the receiver 6 may be implemented as neural networks having parameter vectors $\theta_T$ and $\theta_R$ respectively. If a differential channel model is available, then the channel model can be used as an intermediate non-trainable layer, such that the entire communication system 1 can be seen as a single neural network with parameters vector $\theta=(\theta_T+\theta_R)$, which defines the mapping:

$$f_\theta: M \mapsto \left\{ p \in \mathbb{R}_+^M \,\middle|\, \sum_{i=1}^M p_i = 1 \right\} \times \mathcal{M}$$

Neural networks are often trained and exploited on computationally powerful platforms with general processing units (GPU) acceleration, supporting high precision floating point arithmetic (e.g. 32-bit or 64-bit floating point arithmetic). Such hardware may not be available for some communication systems. Accordingly, the neural networks implementing the transmitter 2 and the receiver 6 of the system 1 described above may be compressed to meet practical constraints. This may be achieved by using a more compact representation of neural network parameters, at the cost of reduced precision. For example, as described further below, compression of weights and/or biases of the neural networks may be achieved through quantization, such that the weights are forced to take values within a codebook with a finite number of entries (e.g. at a lower precision that that provided by a training module).

Figure 2:
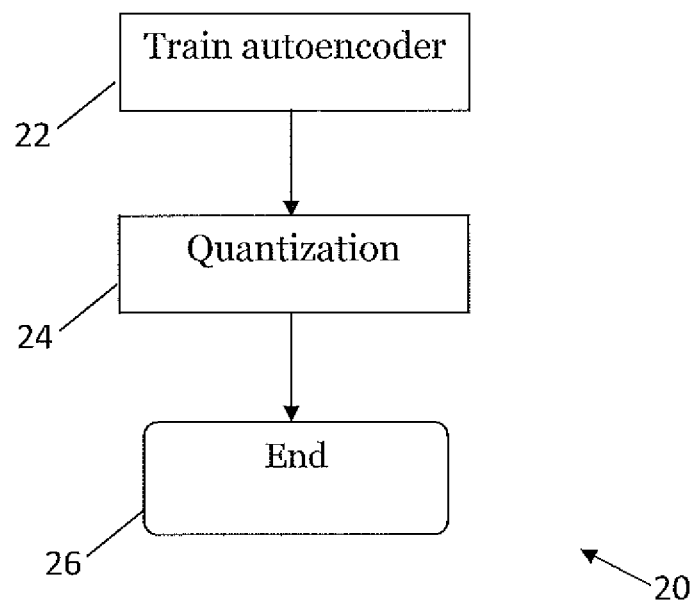
FIG. 2 is a flow chart showing an algorithm in accordance with an example embodiment.

FIG. 2 is a flow chart showing an algorithm, indicated generally by the reference numeral 20, in accordance with an example embodiment.

The algorithm 20 starts at operation 22, where an autoencoder (such as the autoencoder/communication system 1) is trained.

For example, the autoencoder 1 may be trained in a supervised manner using the following stochastic gradient descent (SGD) algorithm:

1. Draw a random set of N messages $\mathcal{S} = \{s_i, i=1, \ldots, N\}$ uniformly from $\mathcal{M}$.
2. Compute $\{p_i, \hat{s}_i\} = f_\theta(s_i)$ for $i=1, \ldots, N$. (Where $\theta=(\theta_T, \theta_R)$, as discussed above.)
3. Apply one step of stochastic gradient descent (SGD) to the trainable parameters (or weights) of the neural network(s), using the loss function:

$$L = \frac{1}{N}\sum_{i=1}^{N} L_i,$$

where $L_i = -\log([p_i]_{s_i}$ is the categorical cross entropy between the input message and the output vector $p_i$.

4. Either stop of repeat according to some stop criteria.

At operation 24, the parameters generated by the operation 22 are quantized using the following function: $\theta_q = \Pi(\theta)$, where:

$\theta$ defines the parameters of the neural network $\theta = (\theta_T + \theta_R)$, as described above;

$\theta_q$ defines the quantized parameters;

$\Pi: \mathbb{R} \mapsto \mathcal{C}$ is the element-wise quantization operation; and $\mathcal{C}$ is the quantization codebook.

The algorithm 20 then terminates at operation 26. The system 1 can then be implemented using the quantized parameters $\theta_q$. This approach significantly reduces memory requirements within the neural networks of the system 1 and reduces the complexity of arithmetic operations, but results in reduced precision.

Figure 3:
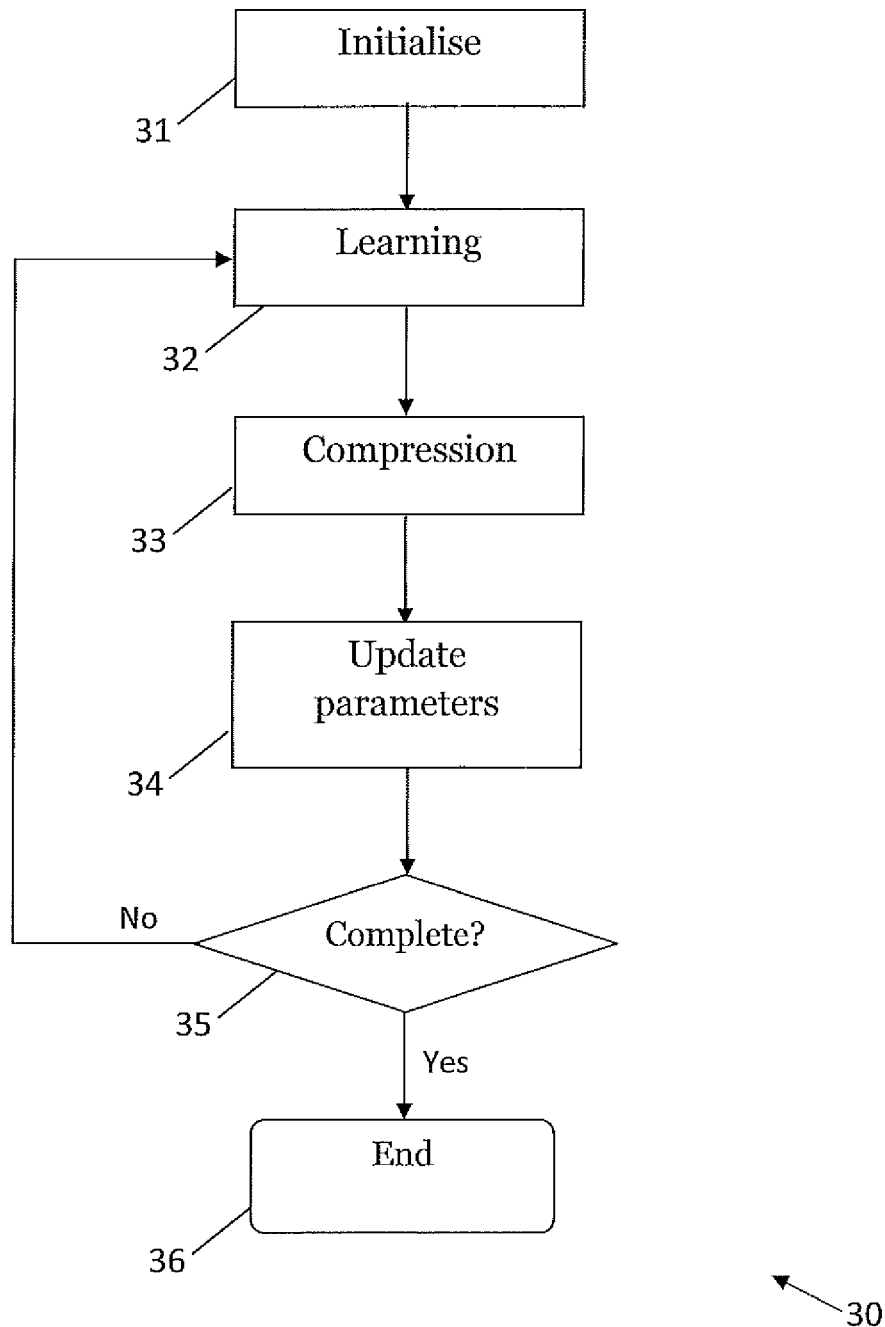
FIG. 3 is a flow chart showing an algorithm in accordance with an example embodiment.

FIG. 3 is a flow chart showing an algorithm, indicated generally by the reference numeral 30, in accordance with an example embodiment.

The algorithm 20 starts at operation 31, where the transmitter 2 and the receiver 6 of the transmission system 1 are initialised, thereby providing a means for initialising parameters of a transmission system.

Operations 32 to 34 implement a learning operation 32, a compression operation 33 and a parameter updating operation 34 that collectively implement a learning-compression algorithm, as discussed further below. At operation 35, it is determined whether or not the learning-compression algorithm is complete. If not, the operations 32 to 34 are repeated. When the operation 35 determines that the learning-compression algorithm is complete (e.g. if a sufficient number of iterations of the operations 32 to 34 have been completed or if a given performance threshold has been met), the algorithm 30 terminates at operation 36.

The learning operation 32 adjusts the weights of the neural networks of the transmitter 2 and the receiver 6 in the non-quantized space. The operation 32 is similar to the training operation 22 described above, but includes an additional penalty term, related to the allowed codebook values in the quantized space. Thus, the learning operation 32 implements a means for updating trainable parameters of the transmission system based on a loss function.

More specifically, we denote by $\mathcal{L}$ the cross-entropy, which is the loss function minimized during training defined by:

$$\mathcal{L}(\theta) = \mathbb{E}_s[-\log([p]_s)]$$

The learning operation 32 solves the following optimization problem:

$$\theta = \operatorname*{argmin}_{\theta} \mathcal{L}(\theta) + \frac{\mu}{2}\left\|\theta - \theta_q - \frac{1}{\mu}\lambda\right\|^2$$

Where:

$\mu$ is a parameter which increases as the training progresses (such that $\frac{1}{\mu}$ reduces);

$\theta_q$ is the projection of the solution of the previous learning step on the codebook; and $\lambda$ are Lagrange multiplier estimates.

At compression operation 33, a compression process is carried out in which the adjusted weights are quantized. Thus, the compression operation 33 implements a means for quantizing trainable parameters of the transmission system.

More specifically, the compression operation 33 may perform the element-wise quantization of $$\theta - \frac{1}{\mu}\lambda:$$

$$\theta_q = \Pi\left(\theta - \frac{1}{\mu}\lambda\right)$$

Where $\theta$ was computed during the learning operation 32. We denote the codebook by $\mathcal{C}$. The quantizing the scalar $$\theta - \frac{1}{\mu}\lambda$$

can be expressed as:

$$\theta_j = \Pi\left(\theta - \frac{1}{\mu}\lambda\right) \stackrel{\Delta}{=} \operatorname*{argmin}_{c \in C} \mathcal{L}\left|\theta_j - \frac{1}{\mu}\lambda - c\right|$$

Which simply means to find the closest element within the quantization codebook $\mathcal{C}$.

At operation 34, various parameters of the algorithm 30 are updated, as discussed further below.

Thus, the algorithm 30 iterates between the learning operation 32 and the compression operation 33. At the end of each operation, the Lagrange multiplier elements are updated. The algorithm 30 can be expressed mathematically as set out below.

The initialisation operation 31 may comprise:

$$\theta^{(0)} \leftarrow \operatorname*{argmin}_{\theta} \mathcal{L}(\theta) \qquad 1.$$

2. $\theta_q^{(0)} \leftarrow \Pi(\theta^{(0)})$
3. $\lambda^{(0)} \leftarrow 0$
4. Initialize $\mu^{(0)}$ with a positive value
5. $i \leftarrow 1$ The learning operation 32 may comprise:

$$\theta(i) = \operatorname*{argmin}_{\theta} \mathcal{L}(\theta) + \frac{\mu^{(i-1)}}{2}\left\|\theta - \theta_q^{(i-1)} - \frac{1}{\mu^{(i-1)}}\lambda^{(i-1)}\right\|^2 \qquad 1.$$

The compression operation 33 may comprise:

$$\theta_q^{(i)} = \Pi\left(\theta^{(i)} - \frac{1}{\mu^{(i-1)}}\lambda\right) \quad 1.$$

The update parameters operation 34 may comprise:
1. Update Lagrange multiplier estimates:

$$\lambda^{(i)} \leftarrow \lambda^{(i-1)} - \frac{1}{\mu^{(i-1)}}(\theta^{(i)} - \theta_q^{(i)})$$

2. Set $\mu^{(i)}$ such that $\mu^{(i)} > \mu^{(i+1)}$
3. $i \leftarrow i+1$

The complete operation 35 may comprise:
1. If $\|\theta^i - \theta_q^{(i)}\|$ is small enough (i.e. below a threshold), then proceed to operation 36, otherwise return to operation 32.

However, the criterion for the complete operation 35 could be implemented in other ways.

The algorithm 30 converges to a local solution as $\mu^{(i)} \to \infty$. This could be achieved, for example, by following a multiplicative schedule $\mu^{(i)} \leftarrow \mu^{(i-1)}a$, where $a > 1$ and $\mu^{(0)}$ are parameters of the algorithm.

It should be noted that the sequence $\mu^{(i)}$ can be generated in many ways. Using a multiplicative schedule (as discussed above), the initial value of $\mu^{(0)}$, as well as a are optimisation parameters (and may be optimised as part of the training operation 32 described above).

It should also be noted that the batch size N as well as the learning rate (and possibly other parameters of the chosen SGD variant, e.g. ADAM, RMSProp, Momentum) could be optimization parameters of the training operations 22 and 32 described above.

As discussed above, quantization of the weights of the transmitter and receiver algorithms can lead to precision loss, which can in turn lead to poor performance if the received signal (e.g. the signal y in FIG. 1) is out of the range of values approximated by the codebook range. To keep the received signal in the range of values approximated by the codebook $\mathcal{C}$, the receiver input can be scaled by a value η, which may or may not depend on the received signal.

Figure 4:
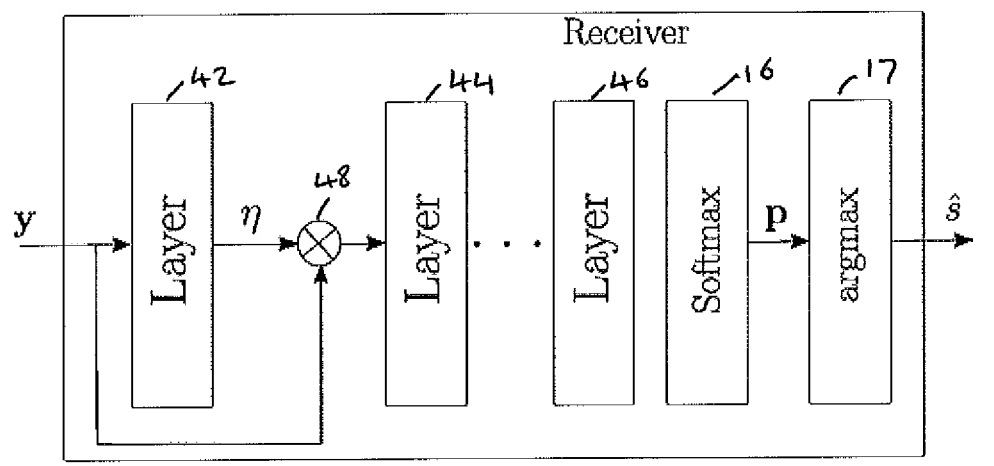
FIG. 4 is a block diagram of a receiver of an example end-to-end communication system in accordance with an example embodiment.

FIG. 4 is a block diagram of a receiver 40 of an example end-to-end communication system in accordance with an example embodiment. The receiver 40 includes the softmax module 16 and the arg max module 17 described above with reference to FIG. 1. Further, the receiver includes a dense layer of one or more units 42, 44 and 46 (similar to the layers 14 and 15 described above). The input stage includes a multiplier 48 by which inputs are scaled by the scaling factor η. The scaling factor η may be a directly trainable factor (that may be trained as part of the learning operation 32), a fixed value, or the output of another neural network whose weights are optimized in the training process described above. Scaling can therefore be used to ensure that the dynamic range of the signal y is matched to the quantization codebook.

In some embodiments, once the autoencoder (e.g. the autoencoder 1) is trained, the transmitter of the autoencoder can be implemented by a simple look-up table, which maps a message $s \in \mathcal{M}$ to a quantized real vector $x \in \mathbb{R}^{2n}$ or a complex vector $x \in \mathbb{C}^n$ (depending on the implementation of the transmitters), where elements $\Re(x_i)$ and $\Im(x_i)$ are quantized to the codebook $\mathcal{C}$. Therefore, compression of the transmitter weights $\theta_T$ in such an arrangement is not necessary, as they will not be required when exploiting the autoencoder. For example, if the message set to be transmitted is relatively small, then the set of quantized neural network weights for each message can be stored.

Figure 5:
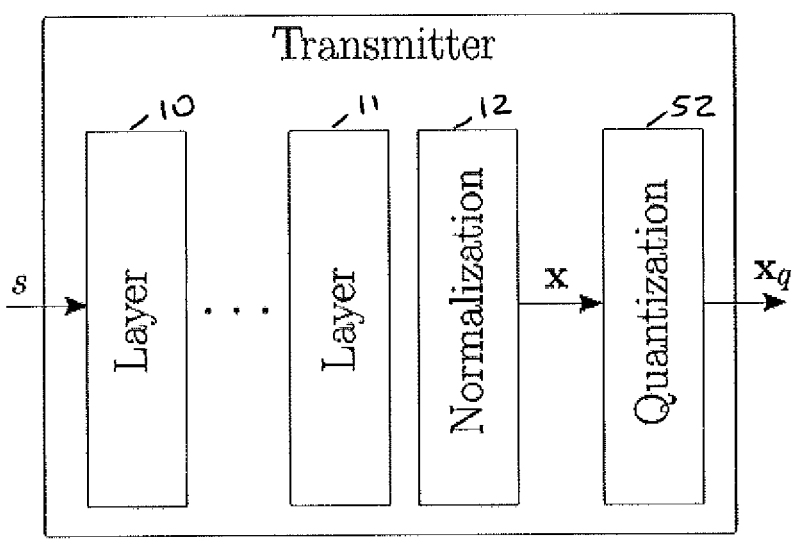
FIG. 5 is a block diagram of a transmitter of an example end-to-end communication system in accordance with an example embodiment.

FIG. 5 is a block diagram of a transmitter 50 of an example end-to-end communication system in accordance with an example embodiment. The transmitter 50 includes the dense layer of units 10, 11 and the normalization layer 12 of the transmitter 2 described above. The system 50 also comprises a quantization layer 52 in which the signal x is transformed into a quantized output $x_q$. The quantization layer 52 allows the training of the autoencoder to be done considering that the output of the transmitter is quantized. Once training is complete, the vector $x_q$ generated by the transmitter 50 for each message $s \in \mathcal{M}$ is stored in a look-up table implementing the transmitter.

It should be noted that the quantization operation Π is not generally differentiable. For back propagation, a simple work-around is to assign a custom derivative for Π, such as $$\frac{d\Pi(x)}{dx} = 1.$$

That is, during the forward pass of the neural network, the quantization is performed by the quantization layer 52, but during the backward-pass (to compare the gradients), the quantization is treated as the identity function.

As described above, one method for quantizing the weights is to use K-bit fixed point arithmetic, instead of using a floating point arithmetic (such as 32-bits or 64-bits floating point arithmetic). Combining the principles of quantization and the use of fixed point arithmetic not only results in using fewer bits to represent the weights of the neural networks described herein, but also greatly reduces the complexity of arithmetic operators.

Using K-bits fixed point arithmetic, with $K_E$ bits used for the integer part and $K_F$ bits used for the fractional part (such that $K_E + K_F = K$), a weight w is represented by:

$$w = \sum_{i=0}^{K_E-1} w_{e,i} 2^i + \sum_{j=1}^{K_F} w_{f,j} 2^{-j}$$

Where $w_{e,i}$ and $w_{f,j}$ take values in $\{0,1\}$. The number of bits K, as well as the sizes of the integer and fractional parts $K_E$ and $K_F$ are fixed. The scalar w is represented by a K+1 bit word ($w_s$, $w_{e,0}$, ..., $w_{e,K_E-1}$, $w_{f,1}$, ..., $w_{f,K_F}$), where $w_s$ is a sign bit (i.e. a bit indicating the sign of the weight).

Figure 6:
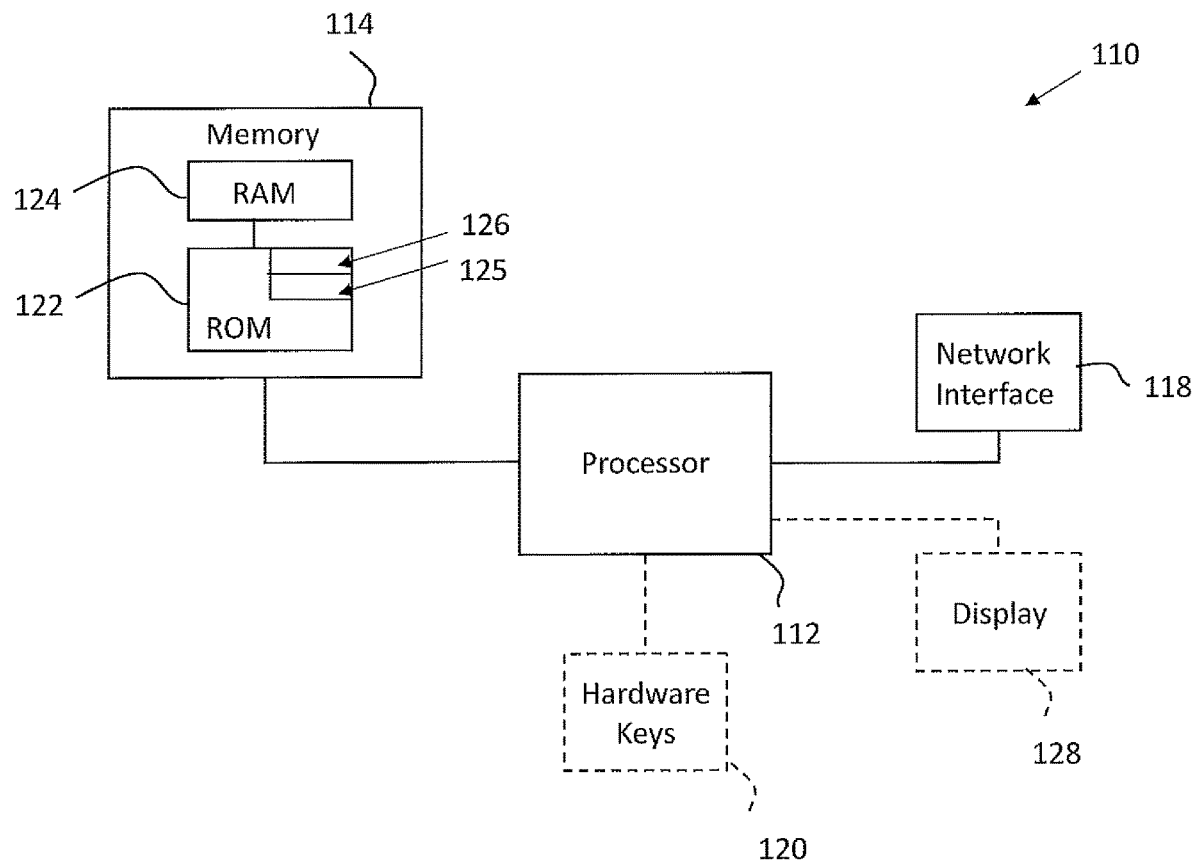
FIG. 6 is a block diagram of a components of a system in accordance with an example embodiment.

For completeness, FIG. 6 is a schematic diagram of components of one or more of the modules described previously (e.g. the transmitter or receiver neural networks), which hereafter are referred to generically as processing systems 110. A processing system 110 may have a processor 112, a memory 114 closely coupled to the processor and comprised of a RAM 124 and ROM 122, and, optionally, hardware keys 120 and a display 128. The processing system 110 may comprise one or more network interfaces 118 for connection to a network, e.g. a modem which may be wired or wireless.

The processor 112 is connected to each of the other components in order to control operation thereof.

The memory 114 may comprise a non-volatile memory, a hard disk drive (HDD) or a solid state drive (SSD). The ROM 122 of the memory 114 stores, amongst other things, an operating system 125 and may store software applications 126. The RAM 124 of the memory 114 is used by the processor 112 for the temporary storage of data. The operating system 125 may contain code which, when executed by the processor, implements aspects of the algorithms 20 and 30.

The processor 112 may take any suitable form. For instance, it may be a microcontroller, plural microcontrollers, a processor, or plural processors.

The processing system 110 may be a standalone computer, a server, a console, or a network thereof.

In some embodiments, the processing system 110 may also be associated with external software applications. These may be applications stored on a remote server device and may run partly or exclusively on the remote server device. These applications may be termed cloud-hosted applications. The processing system 110 may be in communication with the remote server device in order to utilize the software application stored there.

Figure 7A:
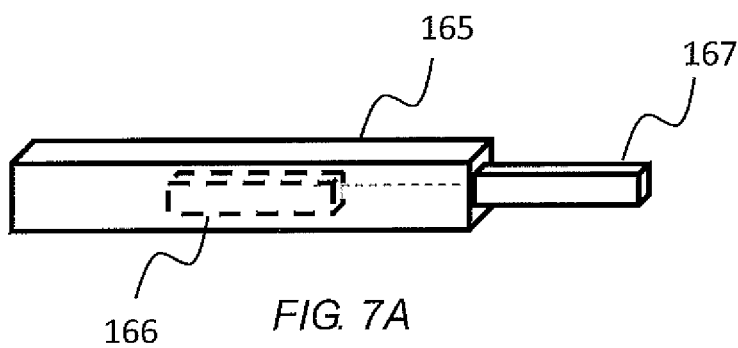
FIGS. 7A and 7B show tangible media, respectively a removable memory unit and a compact disc (CD) storing computer-readable code which when run by a computer perform operations according to embodiments.
Figure 7B:
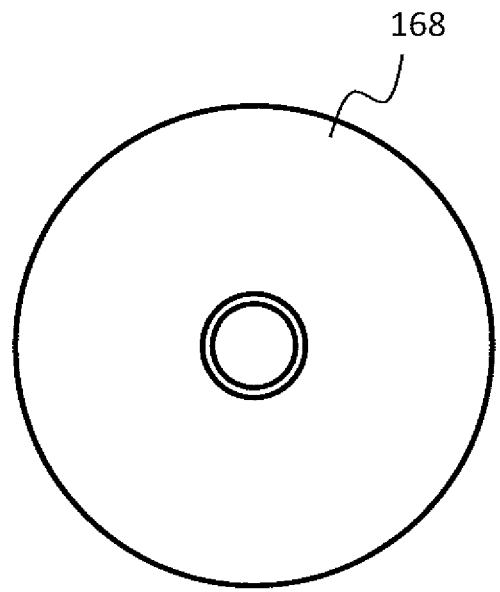

FIGS. 7A and 7B show tangible media, respectively a removable memory unit 165 and a compact disc (CD) 168, storing computer-readable code which when run by a computer may perform methods according to embodiments described above. The removable memory unit 165 may be a memory stick, e.g. a USB memory stick, having internal memory 166 storing the computer-readable code. The memory 166 may be accessed by a computer system via a connector 167. The CD 168 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIGS. 2 and 3 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising at least one processor, and at least one memory storing instructions, that when executed by the at least one processor cause the apparatus to at least perform:
    initializing parameters of a transmission system, wherein the transmission system comprises a transmitter, a channel and a receiver, wherein the transmitter includes a transmitter algorithm having at least some trainable weights and the receiver includes a receiver algorithm having at least some trainable weights;
    updating trainable parameters of the transmission system based on a loss function, wherein the trainable parameters include the trainable weights of the transmitter and the trainable weights of the receiver and wherein the loss function includes a penalty term;
    quantizing said trainable parameters, such that said weights can only take values within a codebook having a finite number of entries that is a subset of the possible values available during updating; and repeating the updating and quantizing until a first condition is reached,
    wherein said penalty term includes a variable that is adjusted on each repetition of the updating and quantizing such that, on each repetition, more weight is given in the loss function to a difference between the trainable parameters and the quantized trainable parameters.

2. The apparatus as claimed in claim 1, wherein said quantized weights are expressed using fixed point arithmetic.

3. The apparatus as claimed in claim 1, further comprising updating variables on each repetition.

4. The apparatus as claimed in claim 1, wherein the first condition is met when a difference between the trainable parameters and the quantized trainable parameters is below a threshold level.

5. The apparatus as claimed in claim 1, wherein the first condition comprises a defined number of iterations.

6. The apparatus as claimed in claim 1, further comprising scaling a signal received at the receiver by a scaling factor.

7. The apparatus as claimed in claim 6, wherein the scaling factor is such that a dynamic range of the received signal is matched to the codebook.

8. The apparatus as claimed in claim 1, wherein said transmitter is implemented as a look-up table.

9. The apparatus as claimed in claim 1, wherein the loss function is related to one or more of block error rate, bit error rate and categorical cross-entropy.

10. The apparatus as claimed in claim 1, wherein updating trainable parameters of the transmission system comprises optimising one or more of a batch size of the transmitter training sequence of messages, a learning rate, and a distribution of the perturbations applied to the perturbed versions of the transmitter-training sequence of messages.

11. The apparatus as claimed in claim 1, wherein said at least some weights of the transmitter and receiver algorithms are trained using stochastic gradient descent.

12. The apparatus as claimed in claim 1, wherein the transmitter algorithm comprises a transmitter neural network and/or the receiver algorithm comprises a receiver neural network.

13. A method comprising:
  initializing parameters of a transmission system, wherein the transmission system comprises a transmitter, a channel and a receiver, wherein the transmitter includes a transmitter algorithm having at least some trainable weights and the receiver includes a receiver algorithm having at least some trainable weights;
  updating trainable parameters of the transmission system based on a loss function, wherein the trainable parameters include the trainable weights of the transmitter and the trainable weights of the receiver and wherein the loss function includes a penalty term; quantizing said trainable parameters, such that said weights can only take values within a codebook having a finite number of entries that is a subset of the possible values available during updating,
  wherein said penalty term includes a variable that is adjusted on each repetition of the updating and quantizing such that, on each repetition, more weight is given in the loss function to a difference between the trainable parameters and the quantized trainable parameters; and
  repeating the updating and quantizing until a first condition is reached.

14. A work product comprising a look up table or array, created by the method of claim 13.

15. A non-transitory computer readable medium comprising instructions, which when executed on an apparatus, are configured to cause the apparatus to perform at least the following:
  initialize parameters of a transmission system, wherein the transmission system comprises a transmitter, a channel and a receiver, wherein the transmitter includes a transmitter algorithm having at least some trainable weights and the receiver includes a receiver algorithm having at least some trainable weights;
  update trainable parameters of the transmission system based on a loss function, wherein the trainable parameters include the trainable weights of the transmitter and the trainable weights of the receiver and wherein the loss function includes a penalty term;
  quantize said trainable parameters, such that said weights can only take values within a codebook having a finite number of entries that is a subset of the possible values available during updating,
  wherein said penalty term includes a variable that is adjusted on each repetition of the updating and quantizing such that, on each repetition, more weight is given in the loss function to a difference between the trainable parameters and the quantized trainable parameters; and
  repeat the updating and quantizing until a first condition is reached.

* * * * *